Sept. 17, 1935.                A. BLUNDELL                    2,014,368
                              SILENCING DEVICE
                         Filed Jan. 25, 1934        3 Sheets-Sheet 1

Sept. 17, 1935.   A. BLUNDELL   2,014,368
SILENCING DEVICE
Filed Jan. 25, 1934   3 Sheets-Sheet 2

Inventor:
Alfred Blundell
by Richard E. Babcock
Attorney

Sept. 17, 1935.  A. BLUNDELL  2,014,368
SILENCING DEVICE
Filed Jan. 25, 1934    3 Sheets-Sheet 3

Patented Sept. 17, 1935

2,014,368

UNITED STATES PATENT OFFICE 2,014,368

SILENCING DEVICE

Alfred Blundell, Coventry, England

Application January 25, 1934, Serial No. 708,329
In Great Britain December 7, 1933

4 Claims. (Cl. 137—160)

This invention relates to a new or improved method of and means for silencing the noise produced by and passage of a fluid through an orifice or conduit, such as that caused by the intake of air or gas to an internal combustion engine, and by the exhaust therefrom. The invention is also applicable to intakes and outlets of air and gas compressors and to fire arms.

The object of the invention is to provide a device for the purposes described which, whilst being extremely efficient as a silencer, offers little or no obstruction to the free passage of the fluid and is inexpensive to produce.

In the accompanying drawings.

Figures 15 and 16, and 17 and 18 are similar views of further alternative applications of the invention.

The improved silencer, whether employed for the purpose of reducing the noise made by a fluid entering or leaving an orifice or conduit, consists of, or embodies as an essential feature, one or more tubular elements the walls of which are constructed so as to be capable of a breathing action which varies automatically with the periodicity of the pulsations of the fluid stream passing through the said element.

Figure 1:
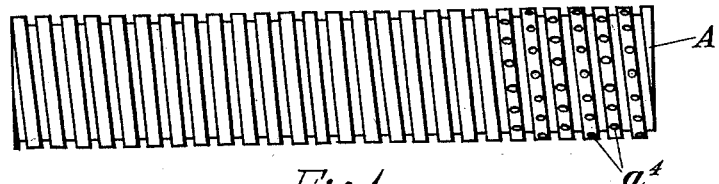
Figure 1 represents a tubular element the construction of which constitutes the essence of the present invention.
Figure 2:
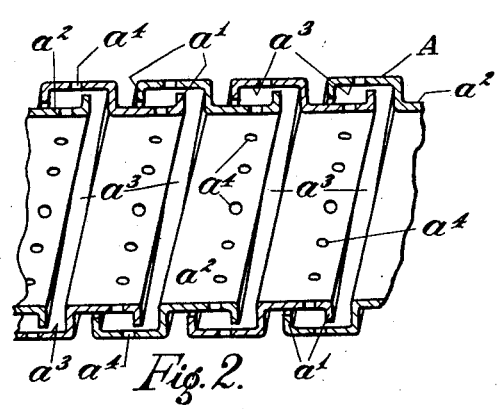
Figure 2 represents an enlarged longitudinal sectional view of a portion of said element.

The said element A, shown in Figure 1, can be made by winding a continuous strip $a$ of metal spirally around a mandrel, the cross-sectional form of the strip, as seen in Figure 2, being such that the adjacent edges $a^1$ loosely interlock with each other.

The said strip, as shown, is of double channel section with the channels $a^2$, $a^3$ oppositely formed and arranged alongside and parallel with each other so that the strip has a substantially Z- or ⋃-section.

In winding the strip on the mandrel the free flanged edge $a^1$ of the inverted channel is caused to engage with the other channel of the adjacent portion of the strip so that when the winding is complete a tubular member is formed which, besides being flexible is also capable of axial contraction and expansion to a degree which is determined by the widths of the channels.

It is observed that when a pulsating current of air or gas is passed through a tubular element constructed as above described a certain degree of relative movement takes place between the coils of the strip and it is believed that the high efficiency of the said element as a silencing device is due to a breathing action which takes place through the continuous spiral joint $a^3$ and which has the effect of damping the pulsations or pressure peaks of the current of air or gas passing through it.

If necessary this breathing action can be assisted or increased by forming the strip with perforations $a^4$ along its length as represented in Figures 1 and 2.

Figure 3:
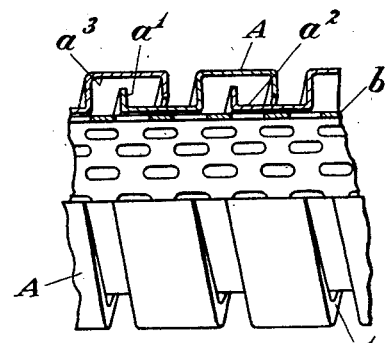
Figures 3–9 illustrate sections of various modifications of the construction of said element.

In cases where the flexible element A is required to be rigidly supported it may be loosely carried by a perforated tube $b$, as shown in Figure 3, one end being preferably left free so that the flexible element can adapt itself to the conditions set up by the pulsating flow of air or gas passing through the perforated tube.

Figure 4:
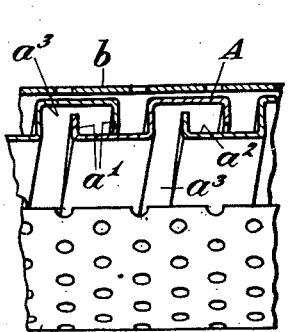
Figure 5:
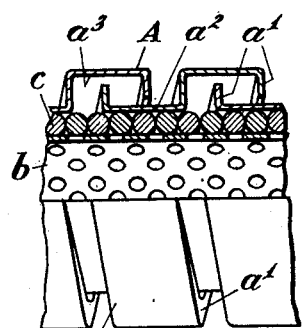
Figure 6:
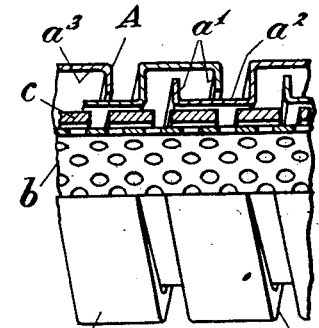
Figure 7:
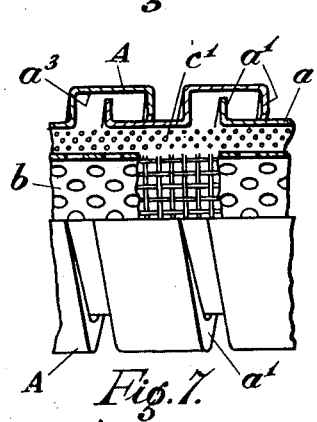
Figure 8:
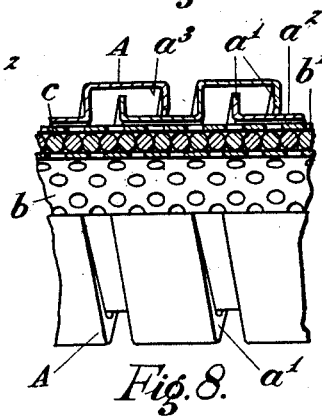
Figure 9:
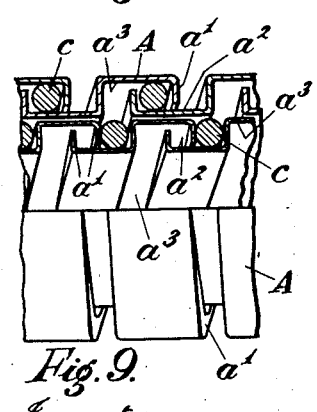

Alternatively, as represented in Figure 4, the flexible element A can be loosely introduced into the interior of the perforated tube $b$ so as to constitute a lining therefor. In either case there may be interposed between the flexible element A and the perforated tube $b$ a winding $c$ of asbestos cord or tape, as shown in Figures 5 and 6, or a layer of wire mesh $c^1$, as seen in Figure 7. Or, as represented in Figure 8, the asbestos cord or the like $c$ can be enclosed between two concentrically arranged perforated tubes $b$, $b^1$ arranged within the flexible element A. In a further modification shown in Figure 9 the flexible element A may be of duplex construction and the asbestos cord $c$ incorporated between the convolutions of the metal strip in each case.

Figure 10:
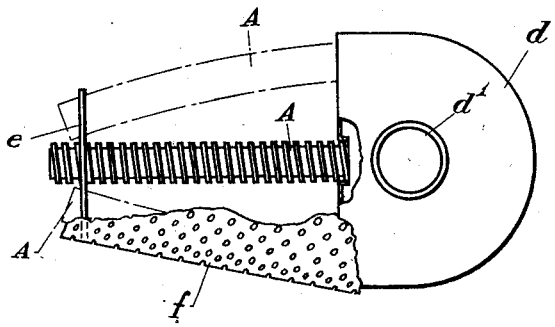
Figures 10 and 11 are side and end views respectively showing the application of the present invention to an air-intake silencer for the carburettor of an internal combustion engine.
Figure 11:
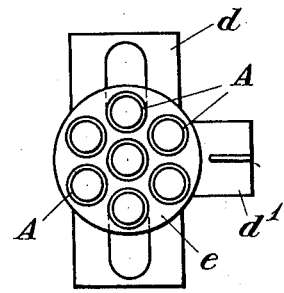

A silencer embodying the flexible element above described as an essential feature may be built up in a variety of different forms. For the purpose of silencing the noise produced at the air-intake of the carburettor of an internal combustion engine by the passage of air therethrough, the improved silencer may, as shown in Figures 10 and 11 consist of a plurality of the flexible elements A arranged in parallel and all communicating at one end with an enclosed chamber $d$ provided with a socket $d^1$ for attachment to the said air-intake of the carburetor. The other ends of the flexible elements may be left free but in order to prevent vibration they are preferably loosely held together by means of a perforated plate e. The said elements are preferably loosely enclosed within an outer casing f of wire gauze or perforated sheet metal which may be conveniently soldered at one end to the said chamber whilst the other end is left open. An intake silencer built up in this manner is found to be extremely efficient when applied to a multicylinder engine in which a plurality of cylinders are supplied with air from a common intake, the pulsations of the air flow being effectively damped by the action of the flexible tubes.

Figure 12:
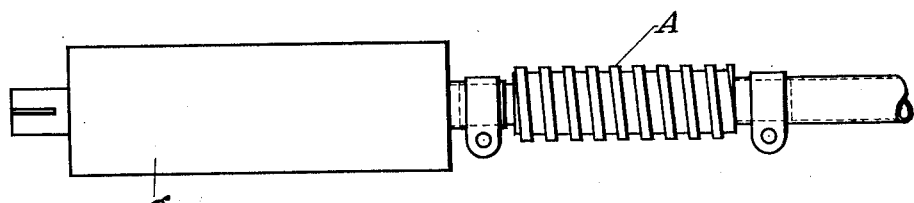
Figure 12 shows the application of the improved silencing element to an exhaust silencer.
Figure 13:
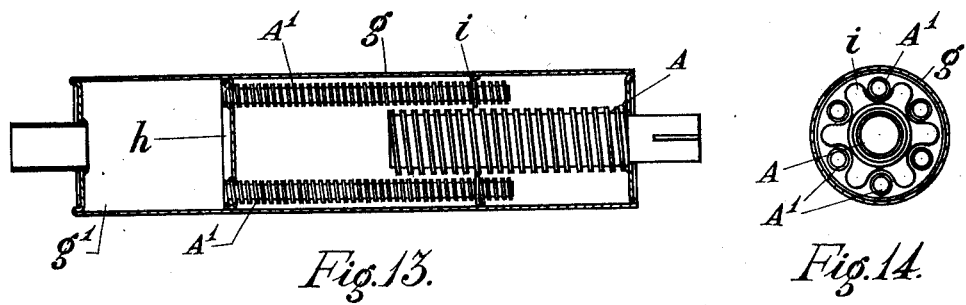
Figures 13 and 14 illustrate in longitudinal and transverse section respectively another application of the invention.
Figure 14:
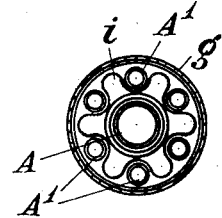

Equally good results are obtained in silencing the noise of exhaust gases by the adoption or incorporation of the flexible element above described and in this case the said element A may form the tail pipe of an ordinary expansion chamber g, as shown in Figure 12. Or, the exhaust gases may enter the expansion chamber through the flexible element and leave it through another or other flexible elements. For example, as shown in Figures 13 and 14, the inlet end of the expansion chamber may be fitted with a single flexible element A of the kind described and of suitable diameter to allow for the free flow of the gases. In this instance a further damping effect on the gases can be produced by causing them on leaving the expansion chamber to pass through a parallel series of flexible elements $A^1$ carried by a plate h into a second expansion chamber $g^1$ before issuing through the outlet to the atmosphere. The free ends of the series of flexible elements may be loosely held in position against vibration by means of a distance piece i.

Figure 15:
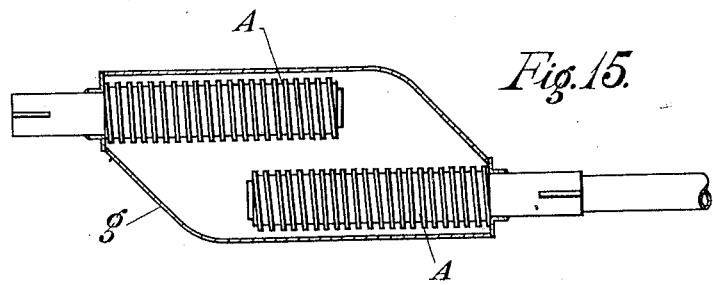
Figure 16:
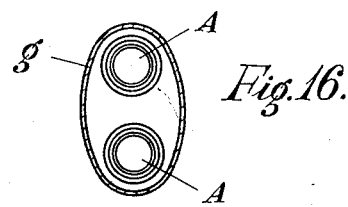

Instead of using a plurality of the flexible elements at the outlet end of the expansion chamber g a single element A may be employed as shown in Figures 15 and 16.

Figure 17:
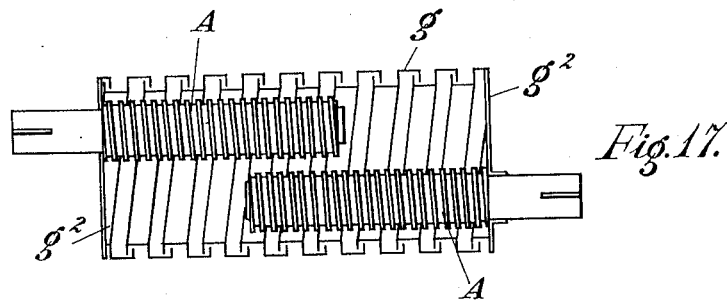
Figure 18:
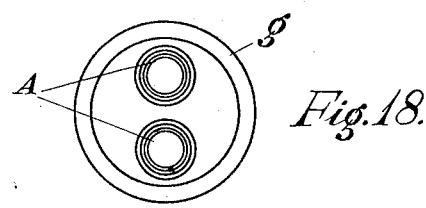

The expansion chamber g may be of conventional sheet metal construction or, as shown, in Figures 17 and 18 it may itself be of the same construction as the flexible element, that is to say, it may consist of a metal strip of the cross-sectional form above described wound spirally upon a mandrel into cylindrical form and closed at each end by plates $g^2$ carrying other flexible elements A, A projecting into the inlet and outlet ends of the expansion chamber so formed.

In every case the cross-sectional area or the aggregate cross-sectional area of the flexible element or elements will always be made greater than the cross-sectional area of the intake or exhaust orifice as the case may be so as to avoid any interference with the free flow of the fluid therethrough.

I claim:—
1. A device for silencing the noise produced by the passage of a fluid through an orifice consisting of a tubular element adapted for connection with said orifice and comprising a metal strip of channel form in cross-section and having reversely presented flanges, said strip being wound in spiral form with said flanges arranged in axially spaced interlocking relationship and approaching, and moving away from, each other with a breathing action in accordance with variations in the body of fluid passing through said element.

2. A device for silencing the noise produced by the passage of a fluid through an orifice consisting of a plurality of tubular elements connected in parallel with said orifice and each comprising a metal strip of channel form in cross-section and having reversely presented flanges, said strip being wound in spiral form with said flanges arranged in axially spaced interlocking relationship and approaching, and moving away from, each other with a breathing action in accordance with variations in the body of fluid passing through said element, adjacent turns of said spirally wound strip being free to move axially with relation to each other.

3. A device for silencing the noise produced by the passage of a fluid through an orifice comprising in combination an expansion chamber communicating with said orifice and a tubular element communicating with said expansion chamber and comprising a metal strip of channel form in cross-section and having reversely presented flanges, said strip being wound in spiral form with said flanges arranged in axially spaced interlocking relationship and approaching, and moving away from, each other with a breathing action in accordance with the variations in the body of fluid passing through said tubular element, adjacent turns of said spirally wound strip being free to move axially with relation to each other.

4. A device for silencing the noise produced by the passage of a fluid through an orifice comprising a perforated tube connected with said orifice and a metal strip of channel form in cross-section having reversely presented flanges, said strip being wound in spiral form with said flanges arranged in axially spaced interlocking relationship and approaching, and moving away from, each other with a breathing action in accordance with the variations in the body of fluid passing through said tube, adjacent turns of the spirally wound strip being free to move both axially and radially with relation to each other.

ALFRED BLUNDELL.